Aug. 23, 1927.  1,640,335
L. O. GRONDAHL
UNIDIRECTIONAL CURRENT CARRYING DEVICE
Filed Jan. 7, 1925  2 Sheets-Sheet 1

INVENTOR:
L. O. Grondahl,
by A. R. Vermill
His attorney

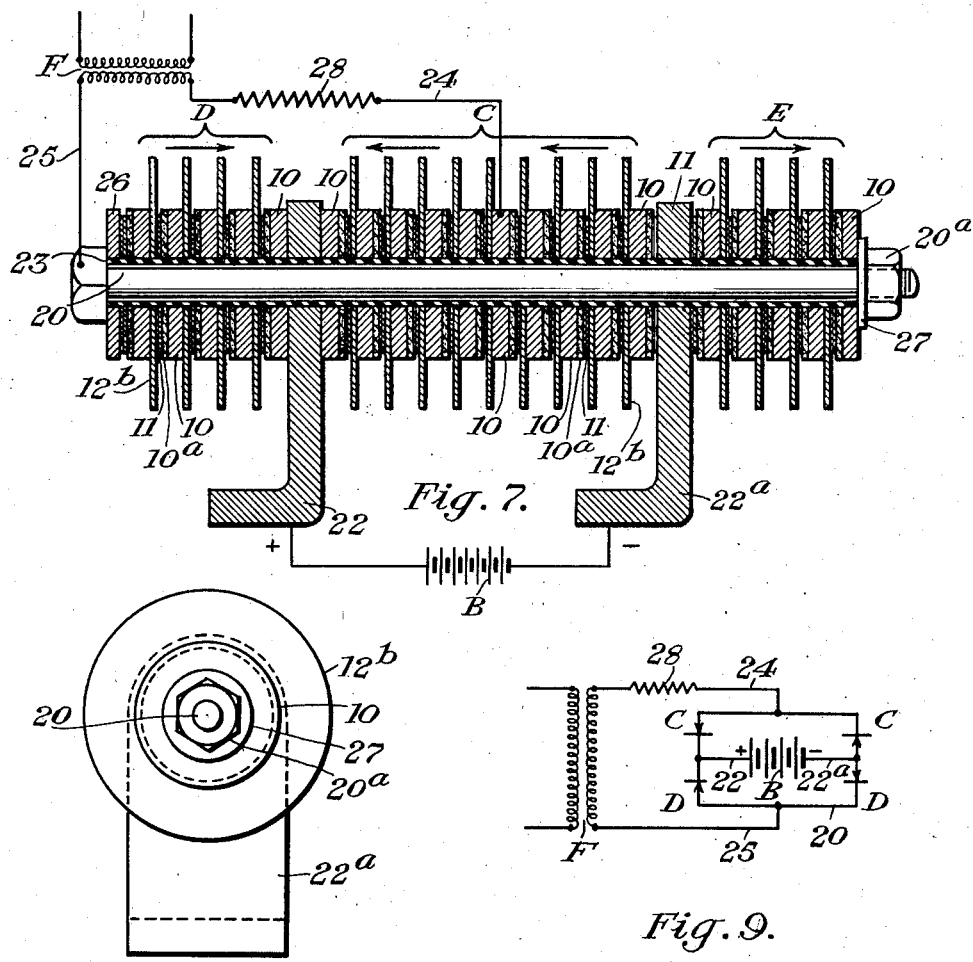
Fig. 7.
Fig. 8.
Fig. 9.
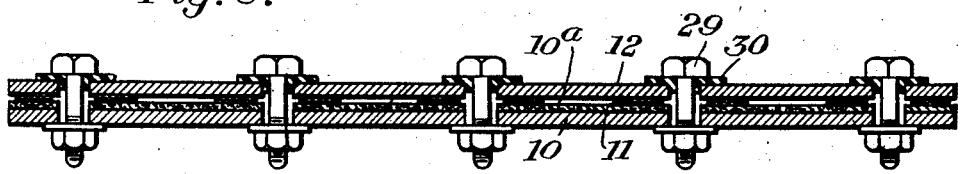
Fig. 10.

Patented Aug. 23, 1927.

1,640,335

UNITED STATES PATENT OFFICE.

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

UNIDIRECTIONAL CURRENT-CARRYING DEVICE.

Application filed January 7, 1925. Serial No. 1,111.

My invention relates to uni-directional current carrying devices, that is, devices which have relatively high conductivity for current flowing in one direction but relatively low conductivity for current flowing in the opposite direction.

The present application is a continuation in part of a copending application filed on the 7th day of March, 1922, Serial No. 541,733, for uni-directional current carrying devices, in so far as the subject matter common to the two is concerned.

I will show and describe certain forms of devices embodying my invention, and will then point out the novel features thereof in claims.

Figure 1:
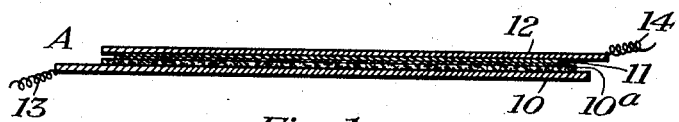
Figure 2:
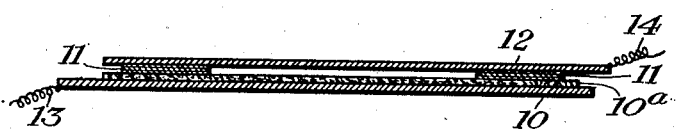
Figure 3:
Figure 4:
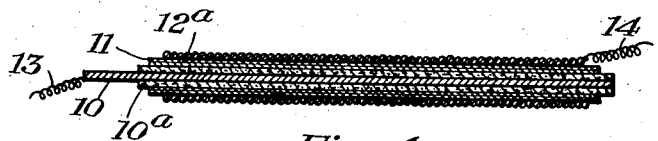
Figure 5:
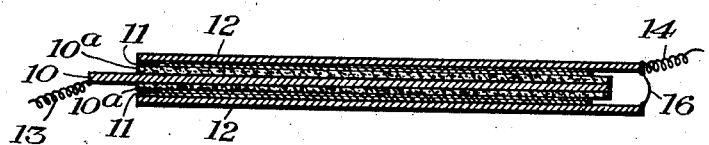
Figure 6:
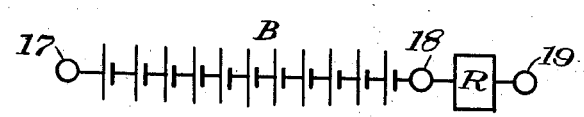

In the accompanying drawing, Fig. 1 is a sectional view showing one form of device embodying my invention. Fig. 2 is a view showing a modification of the device shown in Fig. 1. Fig. 3 is a view showing a device made up of three units each similar to the device shown in Fig. 1. Figs. 4 and 5 are views showing other modifications of the device shown in Fig. 1, and also embodying my invention. Fig. 6 is a diagrammatic view showing a current carrying device embodying my invention associated with a storage battery in such manner that the battery may be charged from a source of alternating current. Fig. 7 is a longitudinal sectional view showing a modified form of device embodying my invention arranged to utilize both halves of each wave of an alternating current. Fig. 8 is an end view of the device illustrated in Fig. 7. Fig. 9 is a diagrammatic view showing one arrangement of electrical circuits and apparatus including the device illustrated in Figs. 7 and 8. Fig. 10 is a sectional view showing a modified form of device embodying my invention adapted to transmit current of comparatively large value.

Similar reference characters refer to similar parts in each of the several views.

Referring first to Fig. 1, the device or unit, which is designated as a whole by the reference character A, comprises a metal plate or electrode 10, and a compound 10ª in intimate electrical contact with a surface of the plate. The compound 10ª is preferably a compound of the metal which constitutes the plate, and it is preferably formed directly on the plate.

As an example, the plate 10 may be of copper, and the compound 10ª, which may be termed the surface coating, may be cuprous oxide. As another example, the metal plate 10 may be iron, and the compound or surface coating 10ª may then be an iron oxide. Against the layer of oxide 10ª is placed a second electrode comprising one or more sheets 11 of a conductor of a soft, impressionable character such, for example, as lead foil, and next to the foil 11 is another plate 12 of conductive material, such as copper. The elements of the device are pressed together by means not shown in this view, and the two outside metal plates 10 and 12 are used as terminals for passing electric current through the device; for this purpose terminal conductors 13 and 14 may be provided, if desired.

I have found that a device constructed in the manner just described has a lower resistance when current passes from the compound 10ª to the metal plate 10 than when current passes in the opposite direction, and, consequently, the device may be termed a uni-directional current carrying device, or a rectifier. By this expression I do not mean that no current will pass through the device in one direction, but only that the conductivity in one direction is considerably greater than in the other direction. This property makes it possible to use the device as a rectifier, that is, as a device for transforming alternating current into a substantially uni-directional current.

In the practice of my invention, I preferably form the oxide directly on the metal by oxidizing the metal at a relatively high temperature in an atmosphere containing oxygen. In the case of copper, the temperature used should be in the neighborhood of 1000° C., and below the melting point of copper, such a temperature apparently being essential to the formation of a compound having the proper homogeneity, that is, non-porosity. In preparing this oxide there is always formed a very thin layer of cupric oxide on the surface of the cuprous oxide which constitutes the main body of the oxide. This layer of cupric oxide is preferably removed by suitable means, such, for example, as emery cloth, or a sand blast, or nitric acid, although the removal of such layer is not essential. The device without the cupric oxide removed will function as a rectifier, but rectification is believed to be due solely to the combination of cuprous oxide and copper in intimate contact, and the cupric oxide is preferably removed to reduce the resistance of the device.

In the case of the copper-cuprous oxide rectifier, formation of the cuprous oxide directly on the copper by oxidation seems to be essential to attainment of the desired characteristics.

In order to assure good results, the surface of the copper which is to carry the cuprous oxide should be smooth and clean. Some sheet copper has the appearance of having wrinkled on one side while cooling; such sheets will produce a good rectifier when the smooth side is used to carry the oxide, and a poor rectifier when the wrinkled side is so used. I have not found that it makes any difference whether the copper is hard or soft.

The compound which is formed on the metal must have substantially the same coefficient of expansion as the metal on which it is formed, or at least must adhere sufficiently well and be of such mechanical strength that it does not break loose from the metal on cooling. Perhaps the most essential characteristic of the compound is that it must conduct electricity without decomposition or chemical change, that is, it must be stable or permanent. To give this result the compound must be a metallic conductor as distinguished from an electrolytic conductor wherein the compound decomposes due to the flow of electric current through it. That is, the compound must conduct current electronically and not ionically, and must remain an electronic conductor under all reasonable operating temperatures. In the case of cuprous oxide, I have found no trace of counter electromotive force due to polarization, and no other signs of decomposition after long use. Polarization would be expected if the compound were an electrolytic conductor.

Rectifiers embodying my invention have certain features or characteristics, some of which I will now explain.

*Rectifying ratio.*—The rectifier offers a relatively low resistance to current flowing in one direction, and a relatively high resistance to current flowing in the other direction. The ratio of the high resistance to the low resistance is conveniently termed the rectifying ratio of the device. The resistances in the low and high resistance directions, and the rectifying ratio, vary in response to variation of several factors, some of which are as follows.

*Variation of pressure.*—Within certain limits, I have found that an increase of pressure causes an increase of the rectification ratio. In the case of one particular copper-cuprous oxide specimen, a change from pressure of 10 pounds per square inch to 120 pounds per square inch caused the rectification ratio to increase from approximately 27½ to approximately 120. This increase of ratio is due to the fact that the low resistance decreases with increasing pressure by a greater percentage than does the high resistance. In the case of the specimen just referred to, the high resistance decreased from 620 ohms to 380 ohms as the pressure increases from 10 to 120 pounds per square inch, this change of resistance being about 39%; whereas with the same increase of pressure the low resistance decreases from 22.5 ohms to 3.8 ohms, this change being about 83%. In the case of the low resistance, the change is probably due largely to a decrease in the resistance of the contact between the copper oxide and the second electrode 11 with increase of pressure.

*Thickness of compound.*—As far as I have been able to determine up to the present time, the resistance constants of the device do not change materially with changes in the thickness of the compound. This would indicate that the resistance constants primarily depend on the nature of the layer at the junction between the metal and the compound, and probably on the closeness of the relations between the same.

*Variation of voltage.*—In the case of one copper-cuprous oxide rectifier constructed in accordance with my invention, the resistance in the low resistance direction decreased rapidly from about 500 ohms at the lowest readable voltage to about 50 ohms at 0.4 volt, and then decreased slowly to about 15 ohms at 8 volts. In the high resistance direction the resistance increased from about 500 ohms at the lowest readable voltage to about 1100 ohms at 1.4 volts, and then decreased to about 910 ohms at 8 volts.

*Current carrying capacity.*—The amount of current that can be carried by the rectifier depends on the provision for carrying away the heat that is developed in the rectifier. The rectifier must be kept reasonably cool, as otherwise it deteriorates due to thermal expansion, and in extreme cases it may melt the lead foil which is used for contact. The rectifier should, therefore, be operated at a fairly low temperature, and this can be accomplished by providing necessary ventilation. The only limit to the current carrying capacity that has thus far been found is the necessity for keeping the temperature low.

*Permanency.*—Rectifiers embodying my invention deteriorate very slowly and very gradually, if at all. They do not deteriorate at all if they are properly constructed, that is, if they are clamped tightly and permanently, and if they are protected from chemical action due to the constituents of the atmosphere.

*Time lag.*—Rectifiers embodying my invention are immediately operative in their steady condition the instant they are subjected to voltage. By this I mean that no period of time is required for the resistance factors to reach steady values. The only change that will occur after the application of voltage is a change in the resistance factors if the current value is sufficient to cause a rise of temperature, and the time involved in this change is rather great, being usually of the order of several minutes.

One important feature of my invention is that the rectifiers, being electronic in nature, do not require "forming", as do rectifiers of the electrolytic type such as those using aluminum and aluminum oxide.

At the present time I believe that the main advantage of the metal foil electrode 11 is that it provides a good electrical contact between the oxide $10^a$ and the electrode 12. Perhaps this contact may be secured by other means, such for example, as a metal film deposited on the oxide by sputtering or electro-plating, and in fact this second electrode may be anything which makes a good electrical contact with the cuprous oxide. I have found it advantageous to rub finely divided carbon into the outer surface of the cuprous oxide before applying the metal foil.

It will be seen from the foregoing that in my rectifier two bi-laterally conducting bodies are permanently joined to each other over a relatively extended area, and co-act with each other to produce in and by themselves a uni-laterally conducting combination. In this combination, the layer at the junction of the two bodies appears to constitute a permanent set-up of particles permitting a relatively free flow of electrons in the direction from the copper to the cuprous oxide, while obstructing the flow of electrons in the opposite direction. The rectifying action so obtained takes place without any observable physical or chemical changes in the bodies. In other words, the device can probably be described as a minute electronic valve which is encased by the bodies on both sides of the rectifying layer, thus protecting the rectification against external disturbing influences.

Referring now to Fig. 2, the rectifier here shown is the same as that illustrated in Fig. 1, except that the lead foil 11 is in sections so that it covers portions of the oxide $10^a$, leaving the remaining portions exposed. This arrangement provides for ventilation.

The device shown in Fig. 3 comprises three units A, each the same as the unit illustrated in Fig. 1, the units being spaced by separators 15 of conducting material to provide for ventilation. When ventilation is not necessary, the separators may be omitted, and the upper metal plate 12 of each unit may then constitute the lower metal plate of the next unit above, the upper surface of this plate being oxidized and the lower surface not oxidized. One reason for using a number of units in series as in Fig. 3 is to distribute the voltage reduction over a sufficient number of surfaces to prevent undue rise in temperature.

Referring now to Fig. 4, the metal member 10 on which the oxide is formed, is in the shape of a wire or rod, the entire cylindrical surface being provided with oxide $10^a$. Several layers of lead foil 11 are wrapped around the oxide, and the outer electrode or terminal is wire $12^a$ of copper or other suitable material wrapped tightly around the foil.

In the arrangement shown in Fig. 5, both surfaces of the metal plate 10 are provided with oxide $10^a$, and one or more sheets of lead foil 11 are placed in contact with each layer of oxide. The device is provided with two outer electrodes 12 which are electrically connected by a conductor 16 to form one terminal of the device, the other terminal being the inner plate 10. This structure permits the use of oxide on both sides of the metal member 10, and is advantageous when the device comprises one unit only.

Devices embodying my invention may be used whenever it is desirable to supply uni-directional current of substantial amount to a current consuming device from an alternating current source. For example, they may be used as rectifiers for charging storage batteries from alternating current sources. When so used, the arrangement of connections shown in Fig. 6 may conveniently be employed. In this view, B designates the battery, which is provided with terminals 17 and 18, whereas the rectifier is designated R and may comprise one or more of the units shown in any of the preceding views. One terminal of the rectifier is connected with battery terminal 18, and the remaining terminal of the rectifier is designated 19. Terminals 17 and 18 are used for discharging the battery, and terminals 17 and 19 are used for charging. If desired, the rectifier R may be mounted in one end of the battery case.

One convenient form of multiple-unit device embodying my invention is illustrated in Figs. 7 and 8, in which views the reference character 20 designates a long bolt provided with a nut $20^a$. Mounted on the bolt 20 are a plurality of uni-directional conducting units each similar to the unit A of Fig. 1 in that it comprises a metal washer 10 having an oxidized surface $10^a$, and one or more sheets of lead foil 11 in contact with the oxide. Each two adjacent units are separated by a washer $12^b$ of conducting material, such as aluminum or iron, which takes the place of the electrode 12 in Fig. 1, and this washer is considerably greater in diameter than the other elements in order to provide for heat radiation. All of the parts are insulated from the bolt 20 by a tube 23 of fibre or other insulating material.

The rectifier in the form here shown comprises a central section C, and two outer sections D and E separated from the central section by terminal plates 22 and 22ª, respectively. The units in the central section C are all arranged for high conductivity from right to left, while the units in the outer sections are arranged for high conductivity from left to right, these directions of high conductivity being indicated by the arrows in Fig. 7. By virtue of this arrangement, the rectifier may be connected with an alternating current source and a storage battery in such manner as to utilize both the positive and negative halves of each cycle of the alternating current. To accomplish this, one terminal of an alternating current, such as the secondary of a transformer F is connected with the electrode 10 of the middle unit of section C by a wire 24, and the other terminal of this source is connected with bolt 20 by a wire 25. This bolt is in electrical contact with the left-hand unit of section D through the medium of a washer 26, and with the right-hand unit of section E through the medium of a washer 27, so that the wire 25 is in effect electrically connected with these two outer units. The battery B is connected with the two terminal plates 22 and 22ª. If necessary, a resistance 28 may be interposed between source F and the rectifier, as illustrated.

This arrangement of connections is illustrated diagrammatically in Fig. 9, from which it will be seen that when wire 24 is positive, current flows through the left half of section C, plate 22, battery B, plate 22ª, section E, and bolt 20 to wire 25. When wire 25 is positive, current flows through section D, plate 22, battery B, plate 22ª, and the right half of section C to wire 24.

When the rectifier is required to carry a comparatively large amount of current, a structure such as that illustrated in Fig. 10 may be employed. In this view, 10 is the metal plate provided with a layer of oxide 10ª, 11 is the lead foil, and 12 is the other electrode plate, all as in Fig. 1, except that these elements are of considerably greater area and are clamped together by a plurality of spaced bolts 29. Each bolt is electrically isolated from the upper plate 12 by an insulating bushing 30 of suitable shape. As here shown, the lead foil is in sections which are located adjacent the bolts, although this foil may be in one strip or sheet, perforated to accommodate the bolts. A number of units similar to the one shown in Fig. 10 may, of course, be assembled and connected in the manner shown in Fig. 9 so as to utilize both halves of each alternating current wave if desired.

Although I have herein shown and described only a few forms of devices embodying my invention, it is understood that various changes and modifications may be made therein within the scope of the appended claims without departing from the spirit and scope of my invention.

Having thus described my invention, what I claim is:

1. In combination, copper having cuprous oxide formed thereon, said combination constituting in and of itself a uni-directional current carrying device.

2. In combination, copper having cuprous oxide formed thereon, said combination constituting in and of itself a uni-directional current carrying device, and means for making intimate contact with said cuprous oxide to establish an electric circuit through said combination.

3. In combination, a metal having an oxide of the metal formed thereon, said combination constituting in and of itself a uni-directional current carrying device.

4. In combination, a metal having an electroconductive compound of the metal formed thereon, said combination constituting in and of itself a uni-directional current carrying device.

5. In combination, a metal having an electroconductive compound of the metal formed thereon, said combination constituting in and of itself a uni-directional current carrying device, and means for making intimate electrical contact with the free surface of said compound.

6. In combination, a metal having a compound of the metal formed thereon, said combination constituting in and of itself a uni-directional current carrying device, finely divided carbon rubbed into the free surface of said compound, and an impressionable electrode pressed into intimate electrical contact with said carbon.

7. In combination, a metal having formed thereon a compound which conducts current electronically, said combination constituting in and of itself a uni-directional current carrying device.

8. In combination, a metal and an electroconductive compound in intimate and permanent electrical contact with said metal, said combination constituting in and of itself a uni-directional current carrying device, an impressionable electrode in contact with said compound, and means for pressing said electrode against said compound with considerable force.

9. A bolt, a plurality of units mounted thereon and each comprising the combination of a metal with a compound of the metal formed thereon, such combination constituting in and of itself a uni-directional current carrying device, an impressionable electrode in engagement with the free surface of the compound in each unit, a metal washer larger in diameter than the other elements interposed between each two units to provide for heat radiation, and a nut for clamping said units together on said bolt.

10. In a rectifying device, a copper member constituting the cathode of the rectifier, a layer of cuprous oxide formed on, at least, a portion of the surface of said copper member, and constituting the anode of the rectifier, and means providing connections to said copper member and to said oxide layer to cause the junction therebetween to pass current in the direction from the oxide to the copper more freely than in the reverse direction.

11. In a rectifier device, a body of copper constituting the cathode of the rectifier, a body of cuprous oxide constituting the anode of the rectifier, said two bodies being integrally united over a relatively extended area, the junction between said bodies permitting a relatively free flow of electrons from the copper to the oxide while obstructing electron flow in opposite direction under substantial absence of electrolytic or chemical changes, the thickness and configuration of said bodies on both sides of said junction being such as to protect said junction against external influences tending to impair the permanency of the rectifying properties thereof.

12. In a rectifier device, a copper plate constituting the cathode of the rectifier, a solid layer of cuprous oxide integrally formed over a relatively extended portion of the surface of said plate, the junction between said bodies being utilized to permit a relatively free flow of electrons from the copper to the oxide while obstructing electron flow in opposite direction under substantial absence of electrolytic or chemical changes in the portions near said junction.

13. In a rectifier device, a copper plate constituting the cathode of the rectifier, a layer of cuprous oxide adheringly united to said copper plate over an extended portion of the surface thereof and constituting the anode of the rectifier, means for providing a bi-laterally conducting terminal connection with the side of the oxide layer opposite the junction with the copper, the junction between the oxide layer and the copper serving to permit a flow of current in the direction from said oxide to said copper while preventing a flow of current in opposite direction under substantial absence of electrolytic conduction in the portions adjacent said junction.

14. In a rectifying device, a copper plate having a layer of cuprous oxide integrally formed over a relatively large portion of the surface thereof, means for providing a bi-lateral conducting connection with the side of the oxide layer opposite its junction with the copper over substantially a large portion of the surface thereof, said copper plate and oxide layer being utilized as a current valve permitting the flow of current in the direction from the oxide to the copper and preventing current flow in opposite direction under absence of observable physical or chemical changes adjacent to the rectifying junction.

15. In a rectifying device, two dissimilar, bi-laterally conducting bodies integrally and permanently joined to each other over an extended area, the junction between said two bodies constituting a uni-directional current valve permitting substantially free electron flow only in one direction thereacross under substantial absence of electrolytic or chemical changes in the portions of the two bodies adjacent to said junction.

16. In a rectifying device, two dissimilar bi-laterally conducting bodies integrally joined to each other over an extended area, the junction between said two bodies constituting a uni-directional current valve permitting substantially free electron flow only in one direction thereacross under substantial absence of electrolytic or chemical changes in the portions of the two bodies adjacent to said junction, the conductivity of one of said bodies being relatively low as compared to the conductivity of the other of said bodies.

17. In a rectifying device, a solid body of metal having formed thereon an adhering layer of a chemically different compound having a substantially higher resistance than said metal, and means for utilizing the junction between said metal and said compound as a uni-directional current valve permitting a substantially free flow of electrons therethrough only in one direction, the thickness of said compound being sufficient to prevent dislodgment of particles near said junction, and means for establishing a conducting terminal connection with an extended area of the side of said layer opposite its junction with said metal.

18. A rectifying unit comprising a body consisting of a metal having an electronically conducting compound of the metal formed thereon and integral therewith, the junction between said metal and said compound being permanent and uni-laterally conducting.

19. A rectifying unit comprising a metal a layer of which is transformed into an electronically conducting compound in situ, the compound and the metal forming an integral body and the junction between them being uni-laterally conducting.

20. A body consisting of a metal having an electronically conducting compound of the metal formed thereon and integral therewith, said body, when included in an electric circuit, constituting in and by itself a unidirectional current carrying device.

21. A bolt, a plurality of units mounted thereon and each comprising the combination of copper with cuprous oxide formed thereon and integral therewith, such combination constituting in and of itself a unidirectional current-carrying device, an impressionable electrode in engagement with the free surface of the compound in each unit, a metal washer larger in diameter than the other elements interposed between each two units to provide for heat radiation, and a nut for clamping said units together on said bolt.

In testimony whereof I affix my signature.

LARS O. GRONDAHL.

DISCLAIMER 1,640,335.—*Lars O. Grondahl*, Pittsburgh, Pa. UNIDIRECTIONAL CURRENT-CARRYING DEVICE. Patent dated August 23, 1927. Disclaimer filed February 29, 1932, by the assignee, *The Union Switch and Signal Company*.

Hereby enters the following disclaimer, to wit:

1. Your petitioner hereby disclaims the subject-matter of claims 3, 4, 5, 7, 9, 15, 16, 17, 18, 19, and 20.
2. Your petitioner hereby disclaims the subject-matter of claims 1 and 2, except combinations in which rectification takes place over a relatively wide area at the internal boundary of the copper and cuprous oxide formed thereon.
3. Your petitioner hereby disclaims the subject-matter of claims 6 and 8, except combinations in which the metal is copper and the compound is cuprous oxide and the rectification takes place over a relatively wide area at the internal boundary of the copper and cuprous oxide formed thereon.

[*Official Gazette March 22, 1932.*]